(12) United States Patent
Prudham

(10) Patent No.: US 8,339,003 B2
(45) Date of Patent: Dec. 25, 2012

(54) GEAR MOTOR INCLUDING A COMPACT MULTIPLE-PHASE ELECTRIC MOTOR

(75) Inventor: Daniel Prudham, Thise (FR)

(73) Assignee: Moving Magnet Technologies, Besancon (FR)

( * ) Notice: Subject to any disclaimer, the term of this patent is extended or adjusted under 35 U.S.C. 154(b) by 294 days.

(21) Appl. No.: 12/670,197

(22) PCT Filed: Jul. 11, 2008

(86) PCT No.: PCT/FR2008/001022
§ 371 (c)(1),
(2), (4) Date: May 27, 2010

(87) PCT Pub. No.: WO2009/034270
PCT Pub. Date: Mar. 19, 2009

(65) Prior Publication Data
US 2011/0031824 A1 Feb. 10, 2011

(30) Foreign Application Priority Data
Jul. 24, 2007 (FR) ...................................... 07 05372

(51) Int. Cl.
*H02K 37/04* (2006.01)
(52) U.S. Cl. .................. 310/83; 310/49.08; 310/216.072
(58) Field of Classification Search .................... 310/83, 310/49.08, 216.001, 216.004, 216.008, 216.071, 310/216.072, 254.1
See application file for complete search history.

(56) References Cited

U.S. PATENT DOCUMENTS

| | | | |
|---|---|---|---|
| 5,432,644 A * | 7/1995 | Tajima et al. .............. 360/99.04 |
| 5,880,551 A * | 3/1999 | Prudham ...................... 310/261.1 |
| 6,043,574 A * | 3/2000 | Prudham ...................... 310/49.08 |
| 6,265,800 B1 * | 7/2001 | Kimura et al. ................ 310/152 |
| 6,603,635 B1 * | 8/2003 | Suzuki et al. .............. 360/99.04 |
| 6,940,269 B2 * | 9/2005 | Komura ......................... 324/146 |
| 8,102,093 B2 * | 1/2012 | Prudham ................ 310/216.071 |

FOREIGN PATENT DOCUMENTS

| | | |
|---|---|---|
| DE | 199 05 748 A1 | 8/1999 |
| EP | 1 244 200 A | 9/2002 |
| EP | 1 261 102 A | 11/2002 |
| EP | 1 560 314 A | 8/2005 |
| FR | 2 844 351 A | 3/2004 |
| WO | WO 97/23943 A | 7/1997 |

* cited by examiner

*Primary Examiner* — Dang Le
(74) *Attorney, Agent, or Firm* — Arent Fox LLP

(57) ABSTRACT

The invention relates to a gear motor including a multiple-phase electric motor formed by a stator portion excited by electric coils and by a rotor having N pairs of poles radially magnetised in alternating directions, the stator portion including two angular sectors alpha-1 and alpha-2 with respective radii R1 and R2, and wide teeth and narrow teeth radially extending from an annular crown, characterized in that the wide teeth have a width higher than or equal to twice the width of the narrow teeth, in that the notch width is higher than the width of a narrow tooth, in that the angular sector alpha-1 is lower than 220° and includes all the coils, and in that the ratio R1/R2 ranges from 1.2 to 2.

9 Claims, 3 Drawing Sheets

GEAR MOTOR INCLUDING A COMPACT MULTIPLE-PHASE ELECTRIC MOTOR

CROSS-REFERENCED TO RELATED APPLICATION

This application is a National Stage entry of International Application No. PCT/FR2008/001022, filed Jul. 11, 2008, which claims priority to French Patent Application No. 0705372, filed Jul. 24, 2007, the disclosure of the prior application is incorporated in its entirety by reference.

This invention concerns a gear motor, including a multiple-phase electric motor, enabling to address particularly demanding specifications in term of size and mass.

In the industrial and automotive sector, the choice of a multiple-phase motor and a reducer is made according to criteria that take into account costs, life span, as well as size and mass. With regard to size, a large number of applications require having a size as reduced as possible and for that purpose, engine and gear integration solutions should be optimal.

Therefore, this invention has for goal to propose one gear motor that is economical and robust, adapted to mass production, and, for that, including a multiphase electric motor enabling an easy integration with a reducer or a system for transforming movement, while respecting any constraints in term of external size and mass.

To this effect, the invention concerns a gear motor including a multiphase motor, advantageously triphasic, formed by a stator part activated by electrical coils, preferably at least three, and by a magnetic rotor presenting N pairs of poles radially magnetized in alternate directions, the stator part presenting an angular sector alpha 1, of radius R1, less than 220°, that regroup all coils, and a toothed angular sector alpha 2, of radius R2.

This motor simplification enables, in addition, to simplify the motor connectics by reducing the number of coils and by regrouping them in a reduced angular sector. This should not impact the motor performance, and the stator structure, presenting wide teeth and narrow teeth, enables nonetheless to guarantee weak residual couples and to optimize the copper volume.

Figure 1:
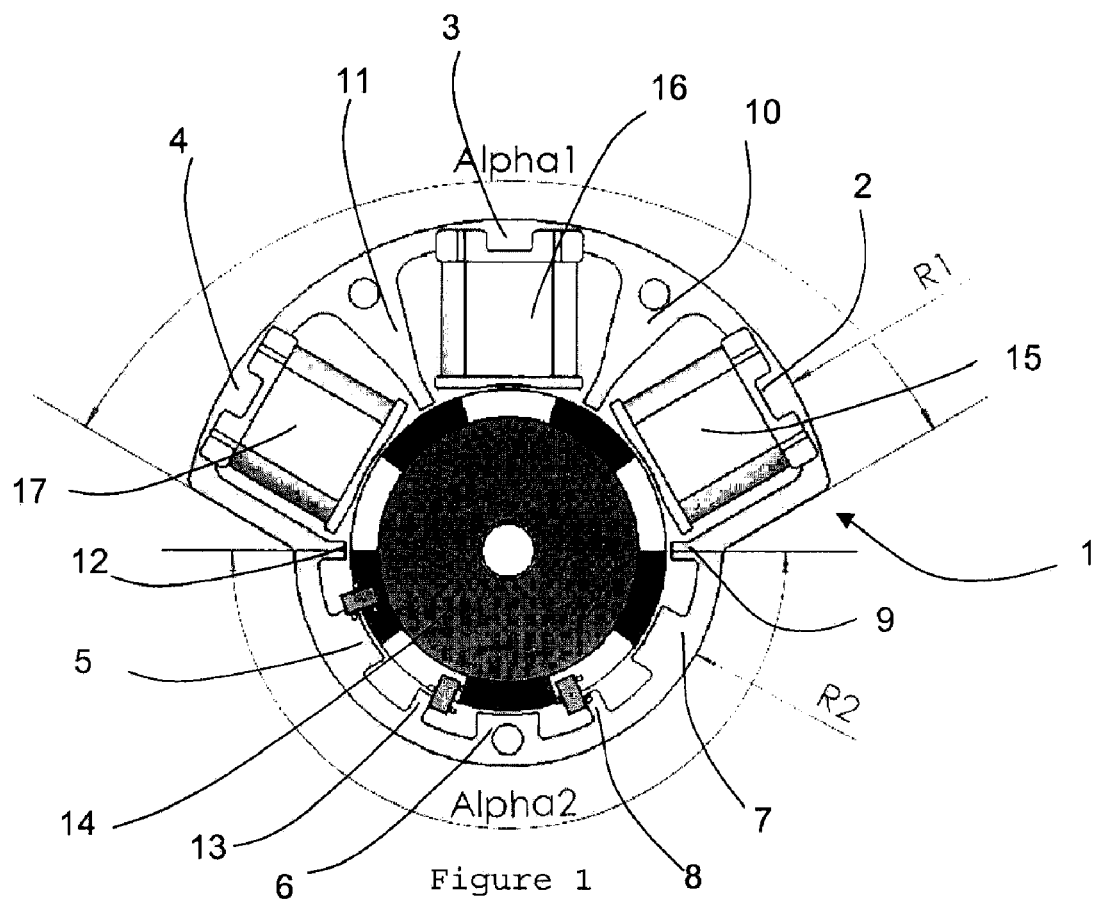
Figure 2:
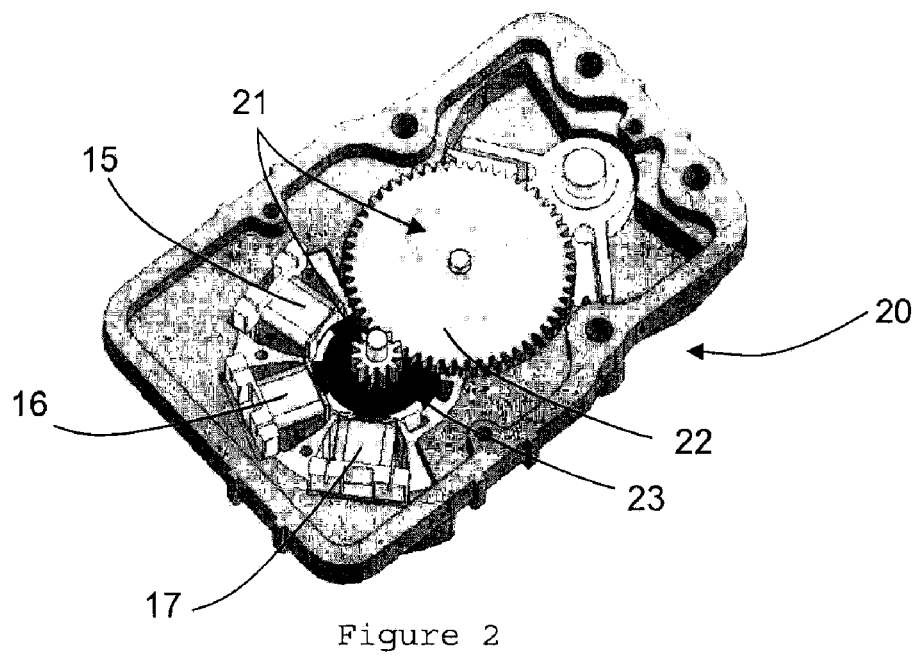
Figure 3:
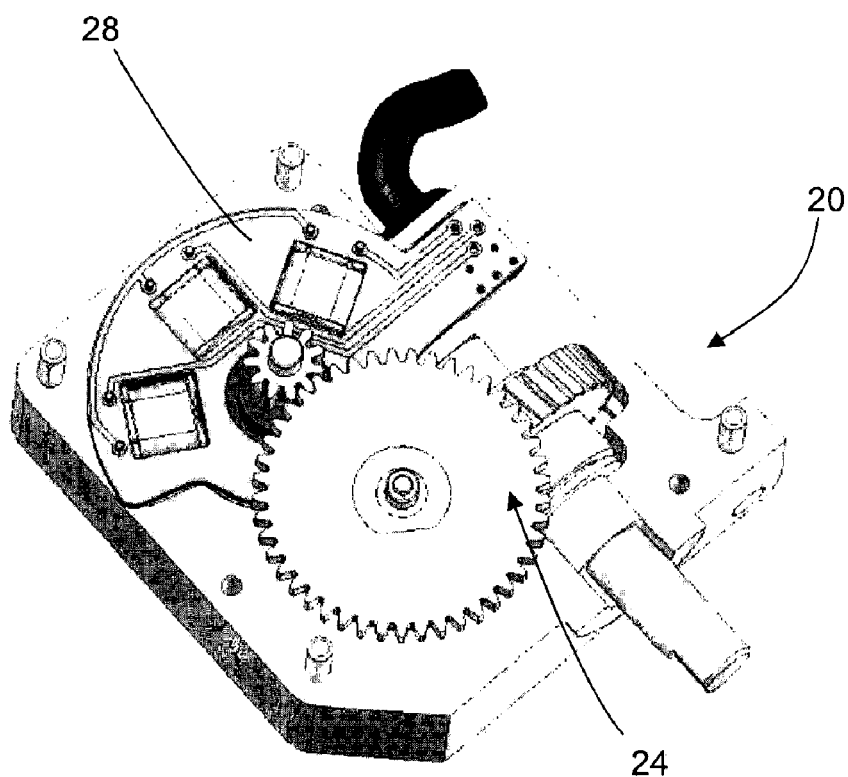
Figure 4:
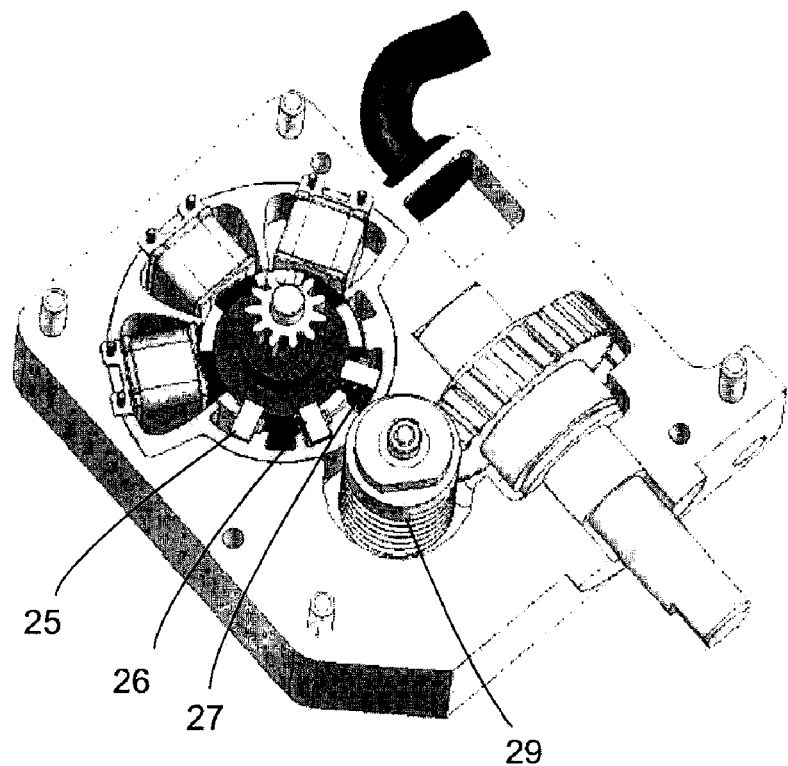
Figure 5:
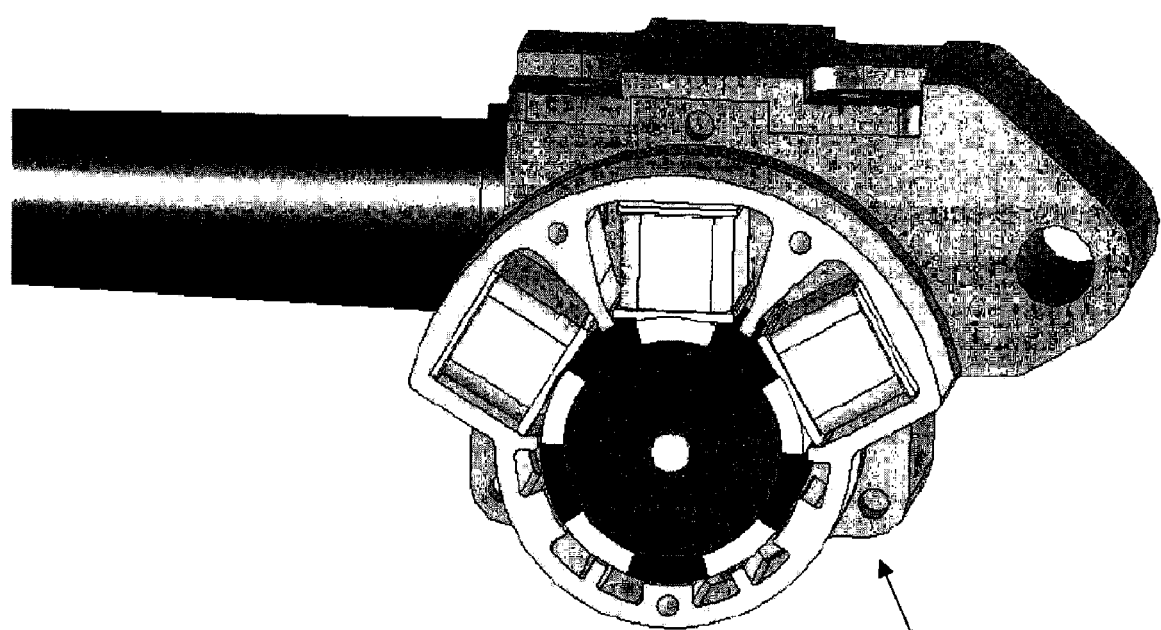

The invention will be better understood by reading the following description, making reference to the attached drawings, where:

FIG. 1 represents a cross-section of the motor of a gear motor according to the invention, FIG. 2 represents a very flat gear motor according to the invention, FIG. 3 and FIG. 4 represent a gear motor according to the invention, including a first straight level of reduction and a second worm wheel level, FIG. 5 represents a gear motor according to the invention, including a single level of reduction made of a worm wheel system.

The motor of the gear motor according to the invention, represented in FIG. 1, includes a stator (1) presenting 6 wide teeth (2 to 7) and 6 narrow teeth (8 to 13) and a rotor (14) presenting N pairs of poles (A1 to A10) magnetized radially in alternate directions. Stator (1) has a 12 tooth structure that ensures the best torque constant, and uses wide teeth (2 to 7) and narrow teeth (8 to 13) to guarantee a very low residual torque through an adequate choice of pole widths. The width ratio between wide teeth (2 to 7) and narrow teeth (8 to 13) is then close to 4.

Coils (15 to 17) are placed around wide teeth (2 to 7) in order to obtain the maximum torque per ampere-revolution of the motor. This torque per ampere-revolution is indeed a function of the coiled tooth width, but is very little influenced by the non coiled tooth width as long as the latter does not show saturation.

Using narrow poles for the non coiled teeth enables to have a very large notch (18) for passing the coil. This notch width (18) is greater than the width of a narrow tooth. This particular geometry of stator (1) enables thus to realize coils (15 to 17) separately then to insert them into stator (1) around the wide teeth (2 to 7). In this way the coil length, and thus the copper volume, are optimized and coils (15 to 17) can come flush with the teeth pole shoe, which minimizes leak flow.

FIG. 2 shows a gear motor (20) particularly flat that includes 3 coils (15 to 17) arranged at 60° from one another for the motor part, and 2 straight reduction levels (21) for the reducer. Wheel (22) of the first reduction level is geared with motor pinion (23) in angular sector alpha 2, and in this way does not impact at all the connection of coils (15 to 17). This integration of wheel (22) in the height of the coils enables to obtain a very flat gear motor (20).

FIGS. 3 and 4 show a gear motor (20) including a first level of straight reduction (21), followed by a worm wheel level (24). Hall sensors (25 to 27) are arranged in sector alpha and are held in a PC board (28) also enabling the connection of coils (15 to 17). Radius reduction between R1 and R2 enables to integrate the reduction second level worm (29) with minimum size.

FIG. 5 represents a gear motor (20) including a single reduction level made of a worm wheel system (24). The motor is placed directly in the axis of the reducer worm (29). The external form of the motor is taken advantage of by arranging angular sector alpha 2, which presents a reduced radius R2, so that the motor extends the least possible past the reducer.

The invention claimed is:

1. Gear motor including a multiphase electric motor formed by a stator portion excited by electric coils and by a rotor having N pairs of poles radially magnetized in alternating directions, the stator portion including two angular sectors alpha-1 and alpha-2, with respective radii R1 and R2, comprising wide teeth and narrow teeth extending radially from an annular crown, characterized in that the wide teeth have a width greater than or equal to twice the narrow teeth width, in that the notch width is greater than a narrow tooth width, in that the angular sector alpha-1 is less than 220° and includes all the coils, and in that the R1/R2 ratio ranges from 1.2 to 2.

2. Electrical gear motor according to claim 1, wherein the electrical motor is triphasic and the stator portion is activated by at least three electrical coils.

3. Electrical gear motor according to claim 1 or 2, wherein N is equal to 5 or to 7, and wherein the stator portion of the engine presents 6 wide teeth and 6 narrow teeth, and is activated by 3 coils placed at 60° from one another.

4. Electrical gear motor according to claim 3, including elements for detecting position located in angular sector alpha 2, and acting with the frontal extremity of the rotor.

5. Electrical gear motor according to claim 4, wherein the wheel of the first reduction level is contained in the height of the coil.

6. Electrical gear motor according to claim 3, wherein the wheel of the first reduction level is contained in the height of the coil.

7. Electrical gear motor according to one of claim 1 or 2, including elements for detecting position located in angular sector alpha 2, and acting with the frontal extremity of the rotor.

8. Electrical gear motor according to claim 7, wherein the wheel of the first reduction level is contained in the height of the coil.

9. Electrical gear motor according to one of claims 1 or 2, wherein the wheel of the first reduction level is contained in the height of the coil.

* * * * *